United States Patent
Malkin et al.

(10) Patent No.: US 7,471,320 B2
(45) Date of Patent: Dec. 30, 2008

(54) ELECTRONIC PAN TILT ZOOM VIDEO CAMERA WITH ADAPTIVE EDGE SHARPENING FILTER

(75) Inventors: Kenneth W. Malkin, Haverhill, MA (US); Larry K. Baxter, Stowe, VT (US); Steven C. Taetzsch, Newfields, NH (US); Daniel R. Phelps, Peabody, MA (US)

(73) Assignee: Polycom, Inc., Pleasanton, CA (US)

( * ) Notice: Subject to any disclaimer, the term of this patent is extended or adjusted under 35 U.S.C. 154(b) by 770 days.

(21) Appl. No.: 10/425,535

(22) Filed: Apr. 29, 2003

(65) Prior Publication Data

US 2003/0193584 A1    Oct. 16, 2003

Related U.S. Application Data

(63) Continuation of application No. 09/141,057, filed on Aug. 27, 1998, now Pat. No. 6,614,474.

(51) Int. Cl.
*H04N 5/208* (2006.01)
(52) U.S. Cl. .................... 348/252; 348/240.99; 382/279
(58) Field of Classification Search ................. 348/252, 348/240.2, 240.3, 373; 382/279, 199
See application file for complete search history.

(56) References Cited

U.S. PATENT DOCUMENTS

| | | | |
|---|---|---|---|
| 3,987,243 A | 10/1976 | Schwartz | |
| 4,282,546 A | 8/1981 | Reitmeier | |
| 4,683,496 A | 7/1987 | Tom | |
| 4,691,366 A | 9/1987 | Femster et al. | |
| 4,783,840 A | 11/1988 | Song | |
| 4,941,190 A | 7/1990 | Joyce | |
| 4,945,502 A | 7/1990 | Kwon et al. | |
| 4,963,981 A * | 10/1990 | Todaka et al. | 348/240.2 |
| 4,972,256 A | 11/1990 | Hirosawa et al. | |
| 4,996,592 A | 2/1991 | Yoshida | |
| 5,031,227 A | 7/1991 | Raasch et al. | |
| 5,038,388 A | 8/1991 | Song | |
| 5,050,227 A * | 9/1991 | Furusawa et al. | 382/269 |
| 5,271,064 A | 12/1993 | Dhawan et al. | |
| 5,351,305 A | 9/1994 | Wood et al. | |
| 5,359,363 A | 10/1994 | Kuban et al. | |
| 5,422,827 A | 6/1995 | Niehaus | |
| 5,602,942 A | 2/1997 | Takemoto et al. | |
| 5,734,414 A * | 3/1998 | Nishimura et al. | 348/373 |
| 5,838,371 A * | 11/1998 | Hirose et al. | 348/240.2 |
| 5,844,614 A * | 12/1998 | Chong et al. | 348/699 |
| 5,867,217 A | 2/1999 | Okino et al. | |
| 5,867,606 A | 2/1999 | Tretter | |

(Continued)

*Primary Examiner*—Lin Ye
*Assistant Examiner*—Gevell Selby
(74) *Attorney, Agent, or Firm*—Wong, Cabello, Lutsch, Rutherford & Brucculeri, LLP

(57) ABSTRACT

An apparatus and a method is provided for enhancing a digital image comprised of pixels by adaptively sharpening the pixels and clipping the numerical values of the sharpened edge pixels so as to fall between the smallest unsharpened numerical value and the greatest unsharpened numerical value, respectively, of the pixels located within a neighborhood of the pixels. Pixels which are located on an edge are sharpened in the direction perpendicular to the edge. The threshold value used to ascertain the presence of an edge and sharpening parameter used to control the degree of sharpening can be adaptively controlled by the zoom ratio. The apparatus of the invention is particularly suited for an electronic set-top video camera.

27 Claims, 10 Drawing Sheets

U.S. PATENT DOCUMENTS

| | | | |
|---|---|---|---|
| 5,880,767 A * | 3/1999 | Liu | 347/251 |
| 5,917,961 A * | 6/1999 | Huonder | 382/279 |
| 5,936,682 A | 8/1999 | Thomas et al. | |
| 5,949,920 A * | 9/1999 | Jordan et al. | 382/279 |
| 6,094,508 A * | 7/2000 | Acharya et al. | 382/199 |
| 6,097,847 A | 8/2000 | Inoue | |
| 6,128,033 A | 10/2000 | Friedel et al. | |
| 6,148,117 A | 11/2000 | Lopez et al. | |
| 6,167,414 A | 12/2000 | Schwartz | |
| 6,172,707 B1 | 1/2001 | Ouchi et al. | |
| 6,339,479 B1 | 1/2002 | Kishimoto | |
| 6,363,526 B1 | 3/2002 | Vlahos et al. | |
| 6,456,340 B1 | 9/2002 | Margulis | |
| 6,614,474 B1 * | 9/2003 | Malkin et al. | 348/252 |
| 2001/0022622 A1 | 9/2001 | Eiho et al. | |
| 2002/0015534 A1 | 2/2002 | Hachiya et al. | |
| 2002/0191859 A1 | 12/2002 | Amano et al. | |

* cited by examiner

ELECTRONIC PAN TILT ZOOM VIDEO CAMERA WITH ADAPTIVE EDGE SHARPENING FILTER

CROSS REFERENCE TO RELATED APPLICATIONS

This application is a continuation of U.S. patent application Ser. No. 09/141,057, filed Aug. 27, 1998 now U.S. Pat. No. 6,614,474, to which priority is claimed under 35 U.S.C. § 120.

FIELD OF THE INVENTION

This invention relates generally to digital image processing and more particularly to a video camera with electronic pan, tilt and zoom and an adaptive edge sharpening filter.

BACKGROUND OF THE INVENTION

Video cameras that utilize exclusively solid state components rather than a mechanical movement of lenses and other optical components to pan, tilt, and zoom have numerous economic and functional advantages. An electronic pan, tilt, zoom ("EPTZ") camera is small, fast, inexpensive, quiet, reliable, durable, easy to manufacture and easy to upgrade. Cameras with electronic EPTZ features can be used in, for example, cameras incorporated in set-top boxes for video conferencing, in surveillance cameras, camcorders and digital still cameras, among other applications.

A digital EPTZ camera typically has three main independent components: an imager section, a sharpening filter, and a scaling circuit or "scaler". The imager section typically includes a lens and a solid-state imager chip, such as a charge-coupled device (CCD) or a metal-oxide-on-silicon (MOS) type chip. The imager chip includes a plurality of photosensitive areas (that is, picture elements or "pixels") arranged as a two-dimensional array which is scanned either interlaced or progressively, as is known in the art. Medium resolution imager chips which perform satisfactorily in video set-top applications have, for example, 640 pixels horizontally and 480 pixels vertically. The imager section preferably includes an analog-to digital section to provide digital serial video information. Imager sections and imager chips of this type are well known in the art.

Conventional EPTZ cameras sharpen the image before the image is scaled by the scaler. Virtually all modern imaging systems utilize a standard Laplacian sharpening filter to reduce blurring that results from hardware limitations. The standard Laplacian filter is known in the art and applies a high-pass function to both horizontal and vertical image axes. High-pass filters, however, tend to amplify noise and introduce high-frequency artifacts into the image, such as undershoots and overshoots, which are perceived by the viewer as "halos".

The scaling circuit electronically adapts or "scales" the number of input pixels to match a predetermined output format. For example, video conferencing signals are typically transmitted in the Common Interface Format (CIF) of 352 pixels horizontally and 288 pixels vertically. The imager section described above outputs 640 pixels horizontally and 480 pixels vertically. The scaler has to convert the image to CIF format by "down-sampling", in this example by a factor of 1.83 horizontally and a factor of 1.67 vertically. The scaler generates the respective new horizontal and vertical CIF addresses and computes new video information, e.g., new luminance (Y) and chrominance (C) values associated with the new addresses. Consequently, the scaler can also be used to perform the pan/tilt and zoom functions in an EPTZ camera.

Conventional EPTZ cameras typically do not sharpen the images after scaling. In particular, zoomed-in images tend to appear blurred. The visual appearance of blurry images is most effectively enhanced by sharpening "edges" in the image. An edge can be defined as a linear arrangement of pixels where the luminance (Y) signal changes significantly in a direction perpendicular to the direction of the linear pixel arrangement.

It is therefore an object of the present invention to provide an adaptive edge sharpening apparatus and method which sharpens an image without significantly amplifying noise.

It is a further object of the present invention to adapt the parameters used in the sharpening algorithm to the scaling ratio of the image. It is still another object of the invention to prevent overshoot and undershoot of the sharpened pixel values.

SUMMARY OF THE INVENTION

The adaptive edge-sharpening apparatus of the invention includes a conventional electronic imager section with an image sensor having pixels; a scaler which converts the pixel addresses of the electronic image or a portion thereof, i.e., a zoomed image, and the luminance (Y) and chrominance (C) values associated with these pixel addresses to output values conforming to a predetermined output format, such as the CIF format; preferably an edge detector for determining the location and orientation of an edge in the output pixels; a sharpening filter or "sharpener" for sharpening the output pixels depending on characteristic properties of the edge; and a "clipping" device which clips the luminance (Y) values of the sharpened pixel so as to fall between the smallest unsharpened numerical value and the greatest unsharpened numerical value, respectively, of the pixels located within a neighborhood of the sharpened pixel. A neighborhood of a pixel includes one or more pixels adjacent to the pixel and may also include the pixel itself. The clipping device which is a central feature of the present invention, therefore eliminates objectionable undershoots and overshoots which are commonly associated with high-pass filters, as discussed above.

In an advantageous embodiment, the edge detector detects for each edge pixel an edge orientation. Depending on the specific edge filter used, the edge detector, for example, determines if an edge is oriented horizontally, vertically, or at an angle with respect to the horizontal. Preferably only those pixels located on a line perpendicular to the edge orientation are subsequently used to sharpen the edge pixels.

In another advantageous embodiment, for each image a numerical threshold value is provided for locating and selecting edge pixels. The threshold value preferably depends on the scaling ratio used in the scaler (in the present example the scaling ratio is between approximately 0.5 and 2.0), but can also depend on other camera settings, such the pan and tilt position (reflecting the diminished performance of most optical systems away from the optical axis) and possibly also on the lighting conditions (low lighting introduces more noise). For example, the threshold value is preferably relatively small for a large magnification and relatively large for a small magnification. Alternatively, the threshold value can also be provided by the user.

In still another advantageous embodiment, a sharpening parameter is provided for controlling the sharpening. Like the threshold value, the sharpening parameter can also depend on the scaling ratio and the camera settings.

In yet another advantageous embodiment, pixels which form a local maximum or minimum and which therefore are not located on an edge, are not sharpened. Local maxima or minima can either be determined separately before the pixels are sharpened and subsequently excluded from being sharpened which, however, requires an additional computational step. Alternatively, pixels representing local maxima or minima will be left unsharpened if they are counted as being part of the neighborhood of pixels, because no pixel is allowed to exceed or fall below the value of any unsharpened pixel in the neighborhood of that pixel.

In still another advantageous embodiment, pixels can also be sharpened without edge detection, using the same Laplacian sharpening algorithm, and subsequently clipped.

The invention furthermore includes a method for adaptively detecting and sharpening the edges in images and for clipping sharpened pixel values so that they fall between the smallest unsharpened numeric values and the greatest unsharpened numeric values, respectively, of the pixels located within the neighborhood of the sharpened pixels.

BRIEF DESCRIPTION OF THE DRAWINGS

Other objects, features, and advantages of this invention will be described in the following detailed description with reference to preferred embodiments and the appended drawings, in which.

DESCRIPTION OF THE PREFERRED EMBODIMENTS

Figure 1:
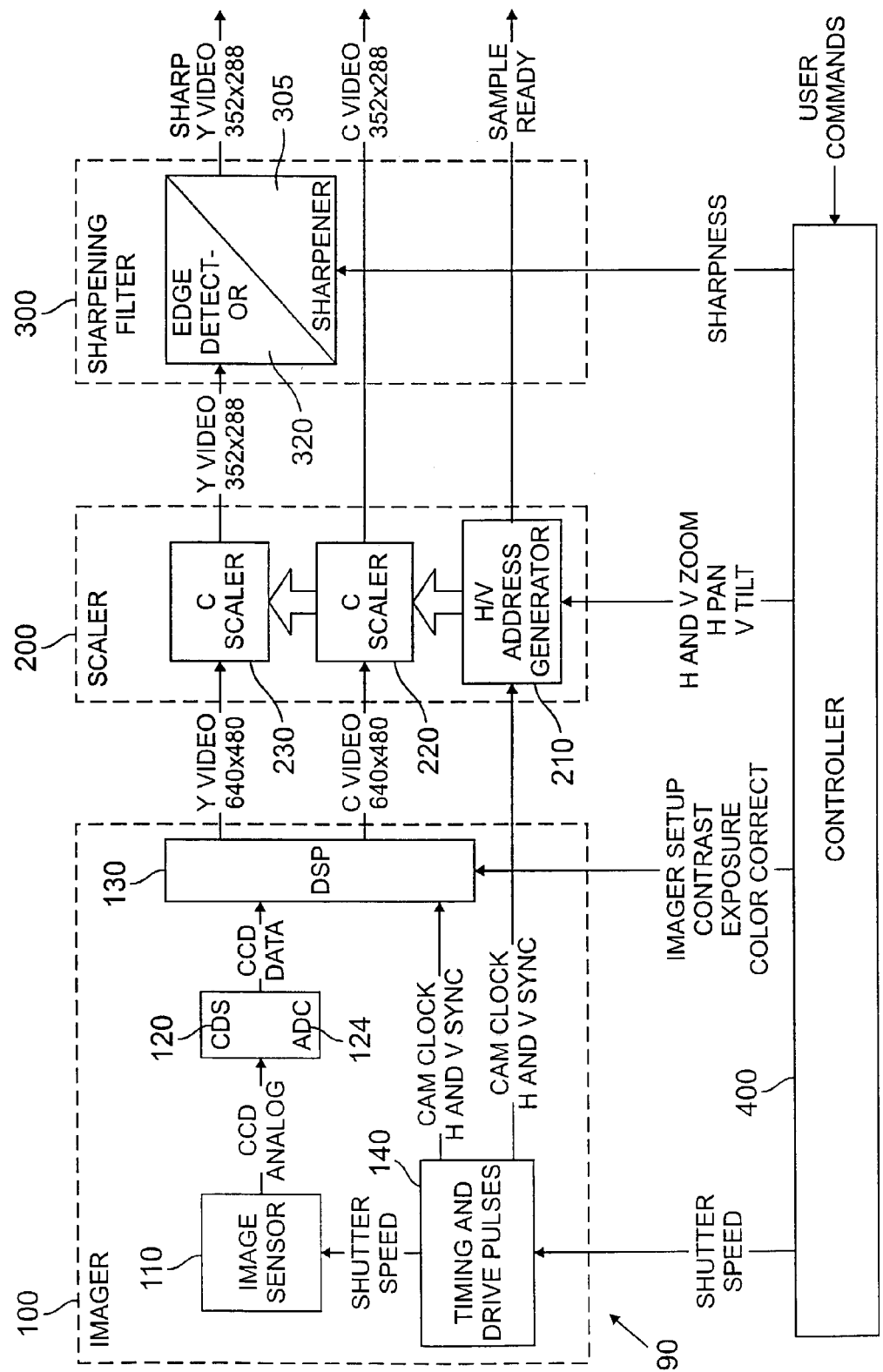
FIG. 1 is an electrical block diagram of a video camera, a control computer, a scaler and a sharpening filter.
Figure 9:
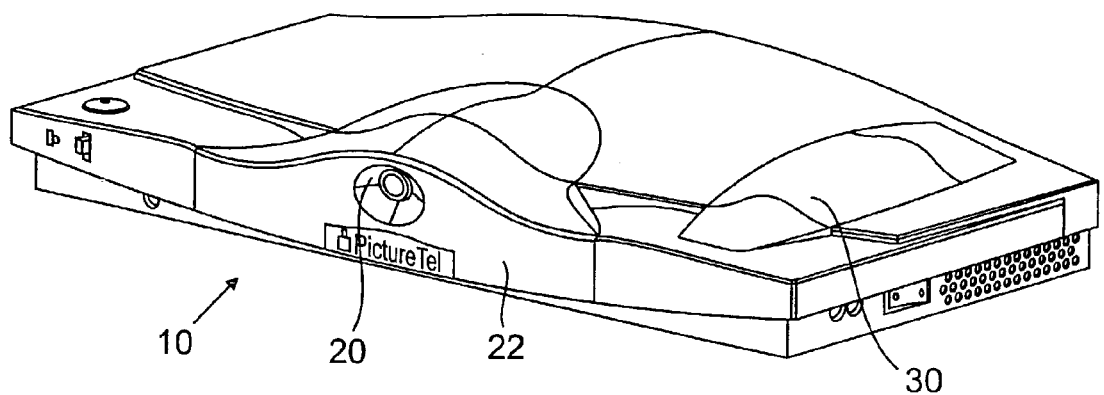
FIG. 9 is a perspective view of a set-top box incorporating the video camera of FIG. 1.

Referring first to FIGS. 1 and 9, there is illustrated a set-top box 10 which includes a camera 20 and incorporates the edge-adaptive sharpening filter (not shown in FIG. 9) of the invention. The camera 20 is preferably an EPTZ camera which provides electronic pan/tilt and zoom movement. The set-top box 10 can also incorporate an optical receiver 22 for receiving an external optical input, for example an IR signal from a remote control unit (not shown). The set-top box 10 can also be enabled to receive acoustical input through a built-in microphone 30, which is preferably directional. Remote microphone(s) (not shown) can also be used. The camera 20 can then automatically electronically pan, tilt and zoom to capture an image of, for example, a speaker in response to signals received through the directional microphone 30 or through the respective remote microphone(s). The set-top box 10 is preferably placed on top of a video monitor (not shown), with a video output signal from the set-top box 10 connected to the monitor, for example, via a cable (not shown).

The video camera 20 can also be adapted for movement relative to the set-top box 10 using conventional mechanical actuators and/or motors (not shown). For example, the image could be coarsely panned and tilted by mechanically adjusting the orientation of the camera 20 relative to the set-top box 10, while a fine adjustment is performed electronically.

In FIG. 1 there is illustrated in the form of a block diagram an embodiment of an EPTZ video camera 90 which includes a conventional imager section 100, a scaler 200, and a sharpening filter 300 which includes a sharpener 305 and an edge detector 320, all of which are in communication with a controller 400.

An imaging device 110, e.g., a CCD or CMOS imager chip, generates analog imaging signals in response to optical radiation impinging on the imaging device 110. The analog imaging signals are subsequently processed conventionally with a correlated sampler (CDS) 120 and an analog-to digital converter 124 and transmitted to a digital signal processor (DSP). The DSP 130 converts the received signals to standard luminance (Y) video signals and chrominance (C) video signals with, in the preferred embodiment, a resolution of 640×480 pixels, and also adjusts, if necessary, picture contrast, brightness (that is, exposure), color balance, and imager setup based on instructions received from controller 400. A timing and drive pulse generator 140 sends cam clock pulses 142 and horizontal and vertical sync pulses 144 to an address generator 210 which forms a part of scaler 200.

As illustrated in FIG. 1, the scaler 200 includes a Y (luminance) scaler 230 and a C (chrominance) scaler 220. The address generator 210 has a horizontal address generator 210h for generating H (horizontal) pixel addresses and vertical address generator 210v for generating V (vertical) pixel addresses, as illustrated in detail in FIGS. 2, 3a and 3b. In the present example, the scaler 200 is adapted to provide at its output pixel addresses and corresponding Y and C values in the CIF format of 352 pixels horizontally by 288 pixels vertically. As mentioned above, the scaler 200 down-samples an input image which has more than 352×288 pixels, by outputting a smaller number of pixels than in the input image and conversely up-samples an input image which has less than 352×288 pixels. For zooming/panning/tilting, the scaler selects a rectangular subset of the array of input pixels, with the size of the subset and its position within the full image determined by user preference. The scaled Y video signal outputted from the Y scaler is controlled to have the desired size (zoom ratio) as well as the desired horizontal position (pan) and vertical tilt position (tilt). It will be appreciated that no panning or tilting is possible when the image is completely zoomed out.

Figure 2:
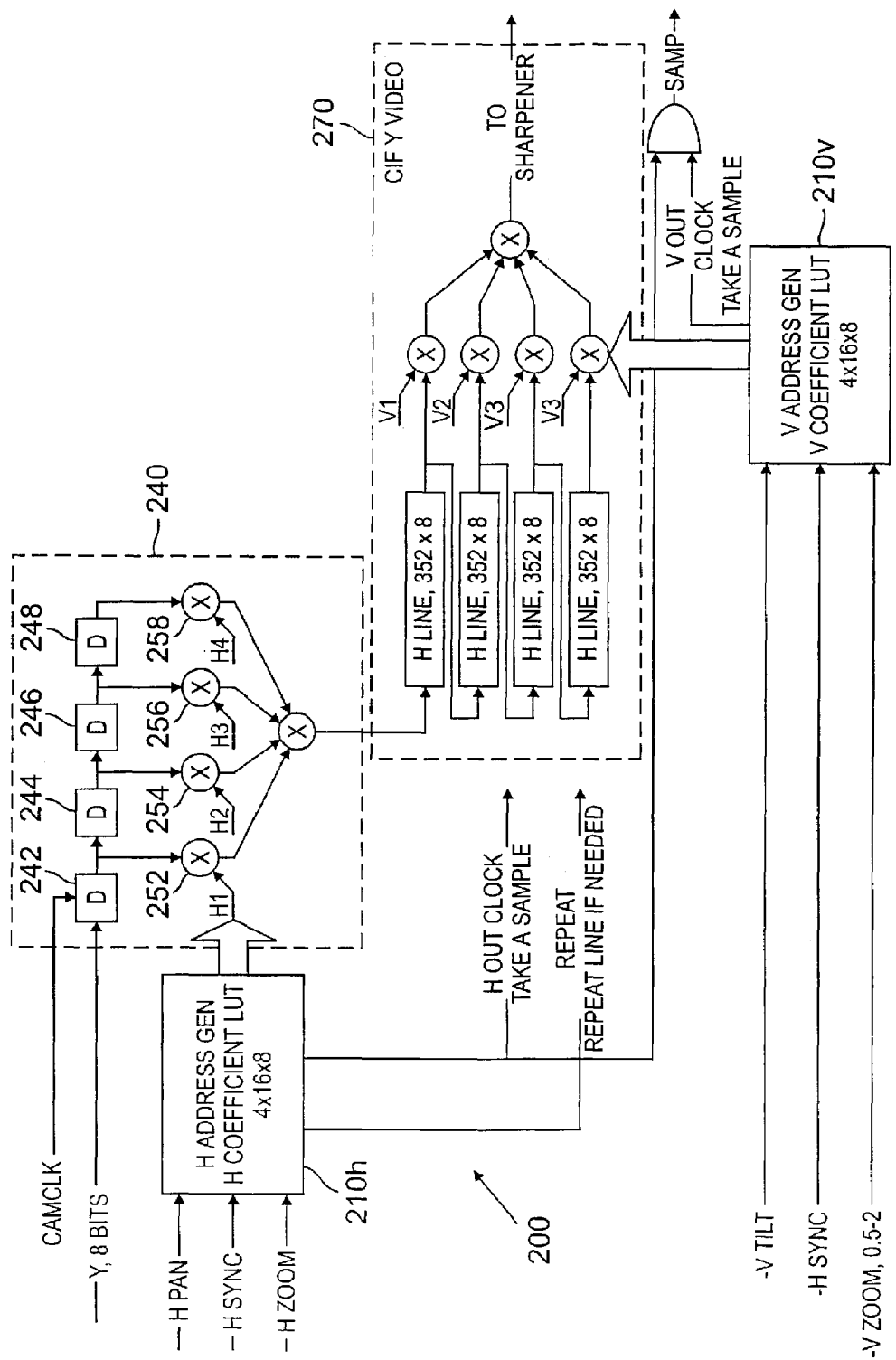
FIG. 2 is an electrical block diagram of the scaler of FIG. 1.

Referring now to FIG. 2, there is illustrated the Y scaler 230 together with a horizontal address generator 210h and a vertical address generator 210v. The Y scaler 230 includes a horizontal filter 240 and a vertical filter 270. In the illustrated example, the luminance Y video signal, which is preferably 8 bits wide, is successively delayed by four one-pixel delays 242, 244, 246, and 248. Each delay 242, 244, 246, and 248 temporarily stores a portion of the Y signal representative of a single pixel so that at any given instant, delays 242, 244, 246, and 248 store four adjacent pixels from a single horizontal row in the image. Each of the four delayed portions of the Y signal is then multiplied by respective coefficients H1, H2, H3 and H4 in respective multipliers 252, 254, 256, and 258. It should be noted that each delay is combined with a multiplier to form a delay/multiplier circuit commonly referred to as a "tap" and that the number of taps determines the quality of the filter. The design of the present invention utilizes a four-tap filter which, with properly chosen tap weights, closely approximates the desired sin(x)/x lowpass filter response.

The coefficients H1, H2, H3, and H4 are determined by the desired zoom ratio and by the phase of the output pixels relative to the input pixels. These coefficients are chosen to produce a lowpass finite impulse response (FIR) filter is known in the digital signal processing field. At a high zoom ratio (that is, telephoto), the coefficients will be approximately shaped like a sin(x)/x curve, or equivalently generated by cubic convolution, and will include side lobes with negative values. At a low zoom ratio (that is, wide angle), the coefficients will be approximately sin(x)/x but at a magnification so that their values are all taken from the center lobe of the sin(x)/x curve and will all be positive. Coefficients scaled to the current zoom ratio at all anticipated phases are precalculated and loaded in the horizontal look-up table (HLUT) at the beginning of the frame to minimize on-the-fly computation.

These coefficients H1, H2, H3 and H4 will also be adjusted according to the exact phase of the output sample relative to the input sample, hence they must be updated for each new output sample. The coefficient generation occurs in H address generator/HLUT 210h shown in FIG. 2.

Figure 3A:
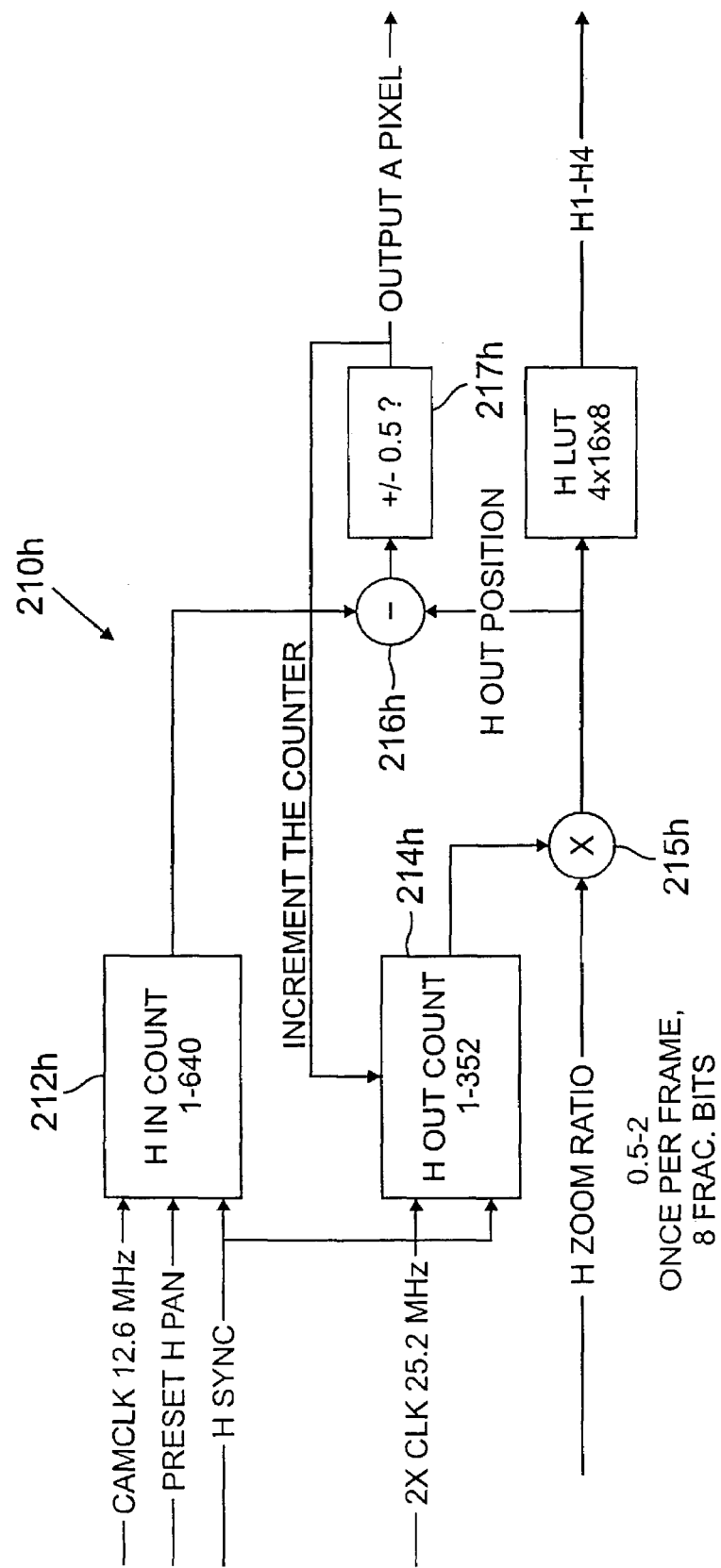
FIGS. 3a and b are electrical block diagrams of the control logic of the scaler of FIG. 1.
Figure 3B:
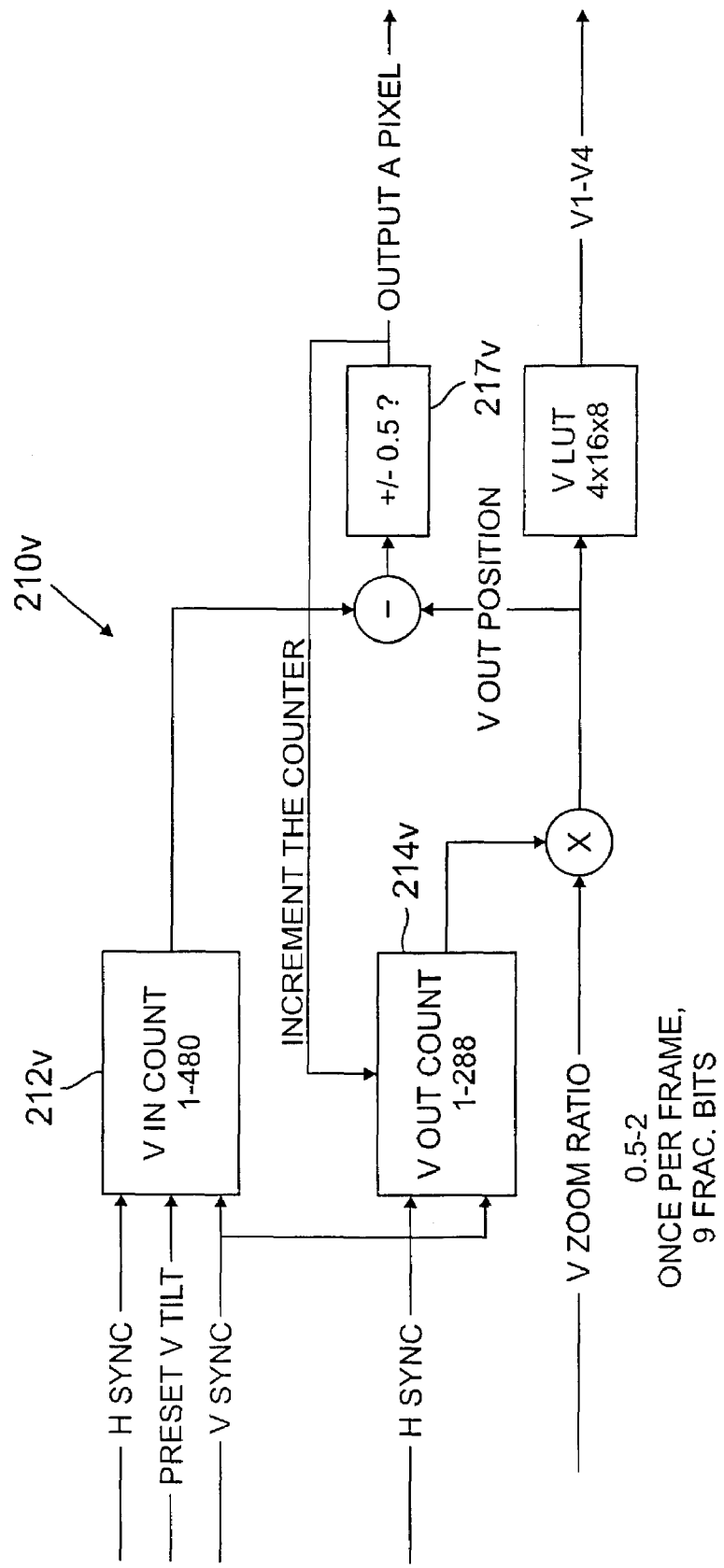

Additional details of the H address generator/HLUT 210h and the V address generator/VLUT 210v are illustrated in FIGS. 3a and 3b. The H-in-counter 212h is preset for each horizontal line of pixels to a value representative of the first desired pixel for inclusion in the output image (that is, the left edge of the output image) responsive to the user's desired horizontal pan angle. As a way to count the inactive input pixels until the first output pixel is needed, the H-in-counter 212h is loaded with a negative number with a magnitude equal to the number of input pixels which will be ignored before reaching the first pixel in the horizontal line to be included in the output image. Then the H-in-counter 212h is advanced by each edge of the camera serial output clock Cam clk. When the H-in-counter reaches zero, the first output pixel is produced.

In FIG. 3a, H-out-counter 214h representing the number of the desired output pixel is clocked at a faster rate, e.g., by 2×clk (from clock bus 142 of FIG. 1) to accommodate the zoom function. The output of the H-out-counter 214h is multiplied by the desired zoom ratio, in this case a number between 0.5 and 2, in multiplier 215h, and the multiplier output, representing the location of the next output pixel as referred to the input, is compared to the output of H-in-counter 212h by subtracting both numbers in adder 216h and using comparator 217h to determine when the output of the H-in-counter 212h is within an integer of the desired location. If the output of the H-in-counter 212h is within an integer of the desired location, the feedback signal to the H-out-counter 214h, which has kept the counter stalled, is released, an output pixel is generated and output to become part of the camera's output image and the H-out-counter 214h is incremented.

When the zoom ratio is near maximum telephoto, two output pixels are needed for each input pixel. Here, the H-out-counter 214h is incremented, but the output of multiplier 215h only changes by a fractional amount, not enough to change its integer value, and as only the integer portion of the multiplier feeds the adder 216h, the equality in comparator 217h is still met and another output sample is taken. As the internal circuitry is clocked at twice the image sensor clock, one extra pixel can be generated. For higher zoom ratios, a higher speed internal clock would be needed.

The output device must be able to handle the asynchronous nature of the output pixel stream, as the output pixels are available at a discontinuous rate depending on zoom ratio. This asynchronism can be handled, for example, by conventional video compression chips which read the incoming pixel stream into a frame of memory. If the output device is not capable of handling asynchronism, a first-in, first-out memory or a full frame memory must be interposed.

The vertical address generator/vertical look-up table (VLUT) 210v, illustrated in FIG. 3b, is identical to the H address generator/HLUT 210h, except it is clocked by horizontal sync pulses instead of camera clock pulses, and is reset during vertical sync instead of horizontal sync. When the zoom ratio is near maximum telephoto, two output lines are needed for each input line and the comparator 217v triggers the output of a second line of data.

The scaled chrominance C signal from the C scaler 220 is positioned responsive to the same pan, tilt, and zoom signals; and is controlled by the same address generator 210, as the luminance Y signal so that the association of chrominance C and luminance Y signal components is unchanged.

After a pixel forming part of the luminance Y signal has been processed by the scaler 200, it is passed on to sharpening filter 300. In the present example, the pixel passed on is a CIF-sized pixel.

Figure 4:
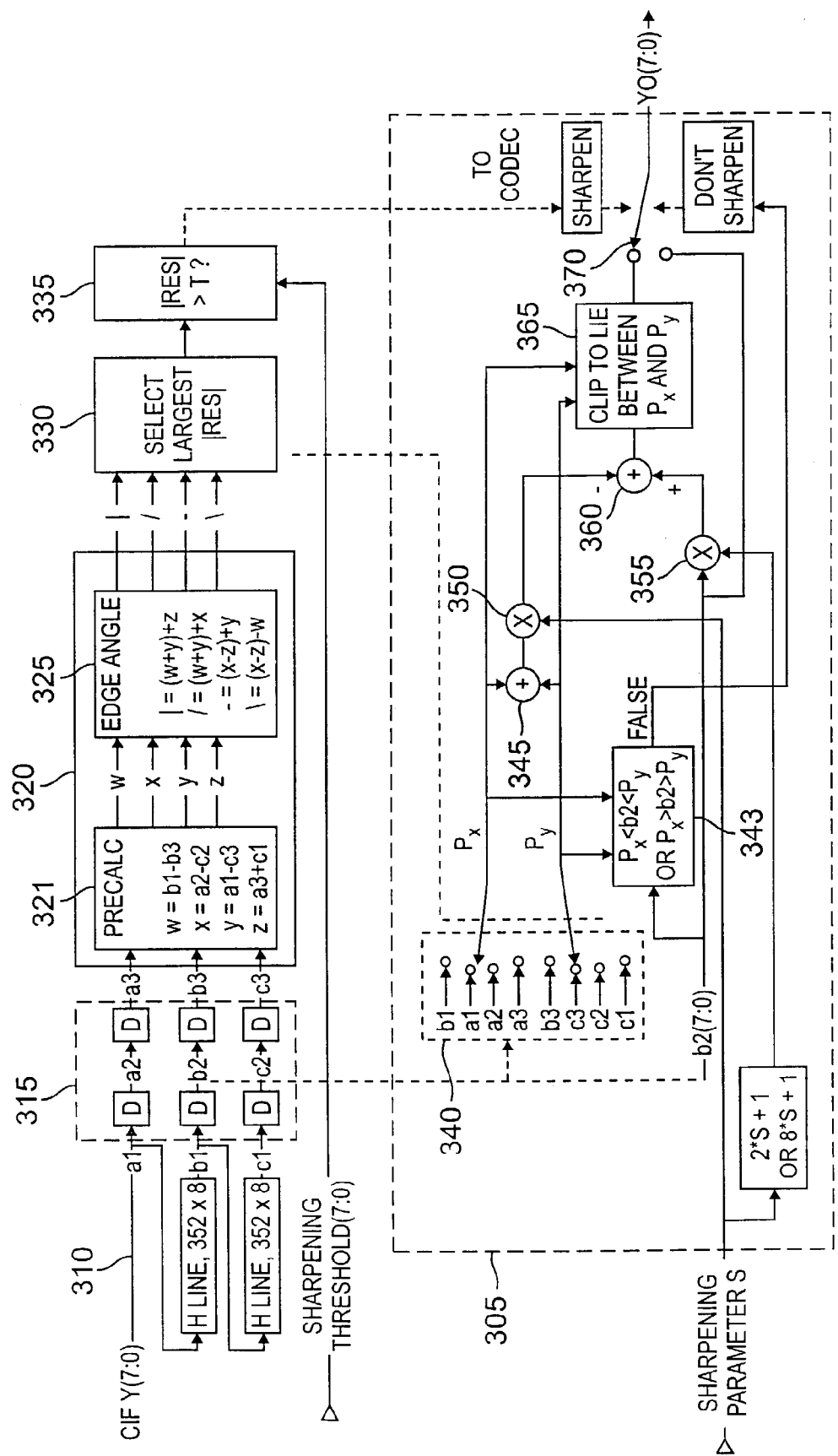
FIG. 4 is an electrical block diagram of the sharpening filter of FIG. 1.

As illustrated in FIGS. 1 and 4, the sharpening filter 300 includes an edge detector 320 and a sharpener 305. Details of the edge detector 320 and the sharpener 305 are depicted in FIG. 4. In the preferred embodiment of the present invention, edges and their orientation are determined first and the pixels located on an edge are subsequently sharpened in the direction perpendicular to the edge. However, as already mentioned above, pixels can also be sharpened without the requirement that the pixels to be sharpened are located on an edge. This aspect will be discussed in detail below.

The edge sharpening filter of the present example operates on three adjacent pixels on each of three successive lines. The unsharpened CIF Y video signal is received from the output of the Y scaler 230 by, in the present example, three H line delays 310, 312, and 314, as illustrated in FIG. 4. The signals from each delay line are then passed on to single-clock-delay registers 315 so that horizontally adjacent pixels in each of the three lines are available simultaneously at the output of registers 315.

The edge detector 320 can be a conventional edge detection filter, such as a Canny, Sobel or Kirsch filter which are known in the art. The edge detector of the present embodiment is a 3×3 Kirsch edge detector and has the following matrix form:

$$\begin{vmatrix} k_{11} & k_{12} & k_{13} \\ k_{21} & k_{22} & k_{23} \\ k_{31} & k_{32} & k_{33} \end{vmatrix}, \text{wherein}[k_{ij}] = \begin{vmatrix} 1 & 0 & -1 \\ 1 & 0 & -1 \\ 1 & 0 & -1 \end{vmatrix}, \quad \text{(Equation 1)}$$

$$\begin{vmatrix} 1 & 1 & 0 \\ 1 & 0 & -1 \\ 0 & -1 & -1 \end{vmatrix}, \begin{vmatrix} 1 & 1 & 1 \\ 0 & 0 & 0 \\ -1 & -1 & -1 \end{vmatrix} \text{ and}$$

$$\begin{vmatrix} 0 & 1 & 1 \\ -1 & 0 & 1 \\ -1 & -1 & 0 \end{vmatrix}$$

for four different edge orientations (vertical, +45°, horizontal and −45°). Other angles can be detected as well by selecting different matrices in Equation 1, as is known in the art.

The edge detector 320 illustrated in FIG. 4 operates on a 3×3 array of pixels comprising 3 adjacent pixels in each of 3 successive horizontal lines and forming a pixel matrix [$a_{ij}$]. In the following, the pixels of the first line are also designated a1, a2, and a3; the pixels of the second line are also designated b1, b2, and b3; and the pixels of the third line are also designated c1, c2, and c3. Pixel b2 is taken as the center pixel on which an edge test is being performed. To determine the orientation of the edge, the pixel matrix is convoluted with each of the Kirsch matrices of Equation 1 via the operation $$Res = \sum_i \left( \sum_j a_{ij} \times k_{ij} \right)$$

For example, the horizontal Kirsch edge detector is applied as follows:

$$Res = \begin{vmatrix} a_1 & a_2 & a_3 \\ b_1 & b_2 & b_3 \\ c_1 & c_2 & c_3 \end{vmatrix} \otimes \begin{vmatrix} 1 & 1 & 1 \\ 0 & 0 & 0 \\ -1 & -1 & -1 \end{vmatrix} \quad \text{(Equation 2)}$$

$$Res = a1 + a2 + a3 + 0 + 0 + 0 - c1 - c2 - c3$$

The value Res for the other orientations is calculated accordingly.

For a particular center pixel b2, the matrix [$k_{ij}$] which after convolution with [$a_{ij}$] provides the largest value of |Res|, determines the orientation of the edge on which the pixel b2 is located. Since the scaler 200 addresses every pixel of interest in an image, every pixel will at some point in time be in the position b2. However, as mentioned above, pixels on the marginal edge of the image, that is pixels which are not surrounded by neighboring pixels, are not considered by the edge detector 320 and are therefore also not sharpened.

Because discrete convolution can quickly become computationally extensive, the edge detector 320 is advantageously divided into a pre-calculation block 321 followed by an edge angle detection block 325. The mathematical operation in both the pre-calculation block 321 and the edge angle detection block 325 are simple additions, unlike the multiplication of Equation 1, which can therefore be executed fast and with simpler circuitry. As noted above, the largest absolute value |Res|$_{max}$ from the four output values supplied by the edge angle detection block 325 is selected by the angle selector block 330 as the edge orientation.

In order to assess if the so determined edge is to be sharpened by sharpener 305, the output |Res|$_{max}$ of edge angle selector block 330 is compared in comparator 335 to a preset sharpening threshold value T. If |Res|$_{max}$ is larger than the threshold value T, then the center pixel b2 is determined to be located on an edge and subject to sharpening.

The response of the edge detection filter does not depend on the value of the center pixel b2, since the matrix element $k_{22}$ is always equal to zero, so that the product $k_{22} \times$b2 is also zero. b2 is deemed to be located on an edge, if the value of b2 lies between the values Px and Py of the two pixels adjacent to it in a direction perpendicular to the edge. Once the direction of the edge is determined, the points Px and Py in the direction perpendicular to the edge are fetched from switch 340 and the conditions Px<b2<Py or Px>b2>Py, respectively, are evaluated in decision block 343. If neither of these two conditions is true, then pixel b2 is not sharpened, as indicated by the position of switch 370. In an alternate embodiment, this test could be omitted if b2 is counted among the pixels in the neighborhood of pixels; the sharpened value of b2 (hereinafter referred to as b2') is always between the largest value and the smallest unsharpened pixel value in the neighborhood to which b2' is clipped.

Once it is determined that center pixel b2 is located on an edge, i.e. |Res|$_{max}$>T, then the neighborhood of the edge pixel is considered for sharpening. The embodiment of the invention uses a Laplacian filter for illustrative purposes; however, other filters, such as differences of Gaussians and unsharp masking, which are known in the art, can also be used. Like the edge filter discussed previously, the sharpening filter can be expressed as a matrix. The size of the matrix depends on the sharpening neighborhood, that is for a 3×3 array of pixels the sharpening matrix is also a 3×3 matrix. The sharpening neighborhood of pixels can be different from the neighborhood of pixels used for edge detection. If edge detection is employed, then the Laplacian filter for the four edge orientations discussed above (horizontal, vertical and ±45°) has the following form:

$$S = \begin{vmatrix} 0 & 0 & 0 \\ -S & 2S+1 & -S \\ 0 & 0 & 0 \end{vmatrix} \begin{vmatrix} -S & 0 & 0 \\ 0 & 2S+1 & 0 \\ 0 & 0 & -S \end{vmatrix}, \quad \text{(Equation 3)}$$

$$\begin{vmatrix} 0 & -S & 0 \\ 0 & 2S+1 & 0 \\ 0 & -S & 0 \end{vmatrix} \text{ and } \begin{vmatrix} 0 & 0 & -S \\ 0 & 2S+1 & 0 \\ -S & 0 & 0 \end{vmatrix}$$

where the sharpening parameter S is a positive scalar value.

Without edge detection, the Laplacian filter may have other suitable forms, such as:

$$S = \begin{vmatrix} -S & -S & -S \\ -S & 8S+1 & -S \\ -S & -S & -S \end{vmatrix} \quad \text{(Equation 4)}$$

In the following discussion, it is assumed that edge detection is used and that b2 is located on a vertical edge. With a value of S=1, the matrix of equation (3) becomes:

$$S = \begin{vmatrix} 0 & 0 & 0 \\ -1 & 3 & -1 \\ 0 & 0 & 0 \end{vmatrix} \quad \text{(Equation 5)}$$

The edge pixel b2 is sharpened by convoluting the pixel matrix [$a_{ij}$] wherein b2 is the center matrix element $a_{22}$, with the sharpening matrix S of Equation 3 according to the formula:

$$b2' \equiv b2_{Sharpened} = \sum_i \left( \sum_j a_{ij} \times s_{ij} \right)$$

or for a vertical edge:

$$b2' = -S*(b1+b3)+(2S+1)*b2$$

The appropriate sharpening filter of Equation (3) is implemented in the apparatus shown in FIG. 4 by first selecting with switch 340 the appropriate pair of neighboring pixels Px and Py which are perpendicular to the previously determined direction of the edge. If pixel b2 is on a vertical edge, as in the present example, then Px is the pixel value of one of pixels b1 and b3. and Py is the pixel value of the other one of pixels b3 and b1. The values of Px and Py are then added in a first adder 345 and multiplied by the negative value of the desired sharpening parameter S which is supplied to the input of the first multiplier 350.

The value 2S+1 is supplied to the input of a second multiplier 355 and multiplied by the value b2, whereafter the outputs of first multiplier 350 and second multiplier 355 are added in a second adder 360. As mentioned above, the edge pixel is sharpened only, as indicated by the position of switch 370, if the absolute value of |Res| obtained by selector 330 is larger than the predetermined threshold value T and conditions in switch 343 hold true.

The value of sharpened center pixel b2' at the output of adder 360 is subsequently "clipped" in clipping block 365 so as to lie between the unsharpened values of the pair of neighboring pixels Px and Py perpendicular to the edge. An unsharpened pixel in the context of the present invention is a pixel as originally supplied at the output of scaler 200 (see FIG. 1). This pixel may already have been processed by a sharpening algorithm internal to the camera. For example, if a center pixel b2 lies on vertical edge and has been chosen for sharpening, its value after sharpening is then clipped so that it lies between the values of the unsharpened pixels b1 and b3 to its left and right, respectively. This clipping allows greater sharpening of edges without causing objectionable overshoots or undershoots.

As mentioned above, the sharpening filter 300 includes a switch 370 which adaptively switches the video Y signal between the sharpened pixel values and the unsharpened pixel values depending on the characteristic features of the edge detection. For example, pixels which are located on edges and exceed the threshold T and which satisfy decision block 343, are sharpened. Otherwise unsharpened pixels are passed on. It will be understood that the logic elements of the edge detector and the sharpening filter can be arranged in a different order as long as they perform the desired function.

The application of a Laplacian sharpening filter to the pixels of an exemplary edge and the beneficial effect of "clipping" the overshoot and undershoot, respectively, will now be explained with reference to FIGS. 5 to 7. The edge depicted by pixels P1 through P7 of FIG. 5 extends over 7 pixels, with pixel values ranging from 0 (light object value) to 48 (dark object value) and would likely appear blurred. The original pixel values are listed in the second column of Table 1. When the Laplacian sharpening filter with S=1 is applied to pixels P1 through P7 (the pixels before pixel P1 and after pixel P7 are not located on an edge and are consequently unchanged), the values listed in the third column of Table 1 are obtained. These sharpened values which are obtained at the output of adder 360, as discussed above, are depicted as pixels P1' through P7' in FIG. 6. It is evident from FIG. 6 that the slope of the curve through pixels P3', P4' and P5' increases in comparison to FIG. 5, but that at the same time an undershoot at pixels P1' and P2' and an overshoot at pixels P6' and P7' are introduced. This undershoot and overshoot, respectively, could create an undesirable halo around the edge pixels.

TABLE 1

| PIXEL | ORIGINAL VALUE | SHARPENED VALUE | CLIPPED VALUE |
|---|---|---|---|
| P1 | 0 | −3 | 0 |
| P2 | 3 | −3 | 0 |
| P3 | 12 | 9 | 9 |
| P4 | 24 | 24 | 24 |
| P5 | 36 | 39 | 39 |
| P6 | 45 | 51 | 48 |
| P7 | 48 | 51 | 48 |

To eliminate such halo effect, the pixel values are "clipped", that is, the new value of each sharpened pixel Pi' is limited to lie between the original, unsharpened values of its neighboring pixels P(i−1) and P(i+1) listed in the second column of Table 1. In those instances in which sharpening is applied in a direction orthogonal to the edge, as is the case in the preferred embodiment of this invention, and in which a 3×3 sharpening filter is applied to a 3×3 array of pixels, as in this illustration, P(i−1) and P(i+1) will be the unsharpened values of the immediately adjacent pixels on either side of the edge on which the pixel Pi is located.

The sharpening operation, using a 3×3 Laplacian filter of the form shown in equations 2 and 3, is carried out specifically as follows. The pixel to be sharpened is assumed to be pixel P2 in FIG. 5. Pixel P2 has an original, unsharpened numerical value of 3. We further assume S=1 in the Laplacian filter, so that the specific numerical values in the Laplacian filter are −1, 3, and −1. To sharpen pixel P2, the numerical value of pixel P1, which is 0, is multiplied by −1, the numerical value of pixel P2 is multiplied by 3, and the numerical value of pixel P3 is multiplied by −1. The three results (that is, 0, 9, and −12) are then added to yield the sharpened value of pixel P2 which, in this case, is −3. This negative value represents an undershoot because the sharpened numerical pixel value of P2 (that is, P2') is less than the unsharpened numerical pixel value of pixel P1 (=0) as shown in FIG. 6. With the traditional sharpening methods and sharpening filters, this undesirable undershoot would remain. The sharpening filter of the present invention, however, clips the sharpened value of P2 (that is, P2') so as to lie between the original, unsharpened numerical values of P1 and P3.

Figure 5:
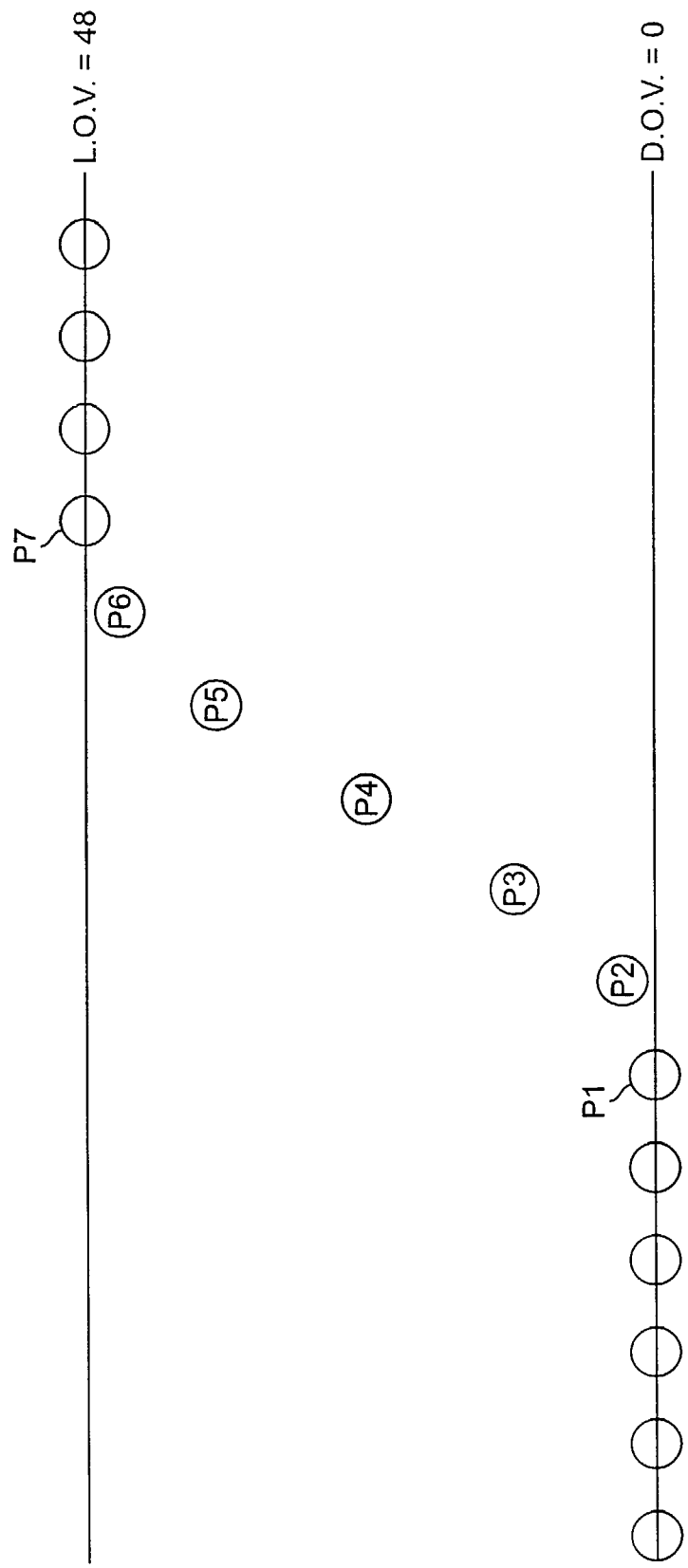
FIG. 5 is a graph of a sequence of individual pixels, illustrating a typical change in the pixel values across a typical edge within an image.
Figure 6:
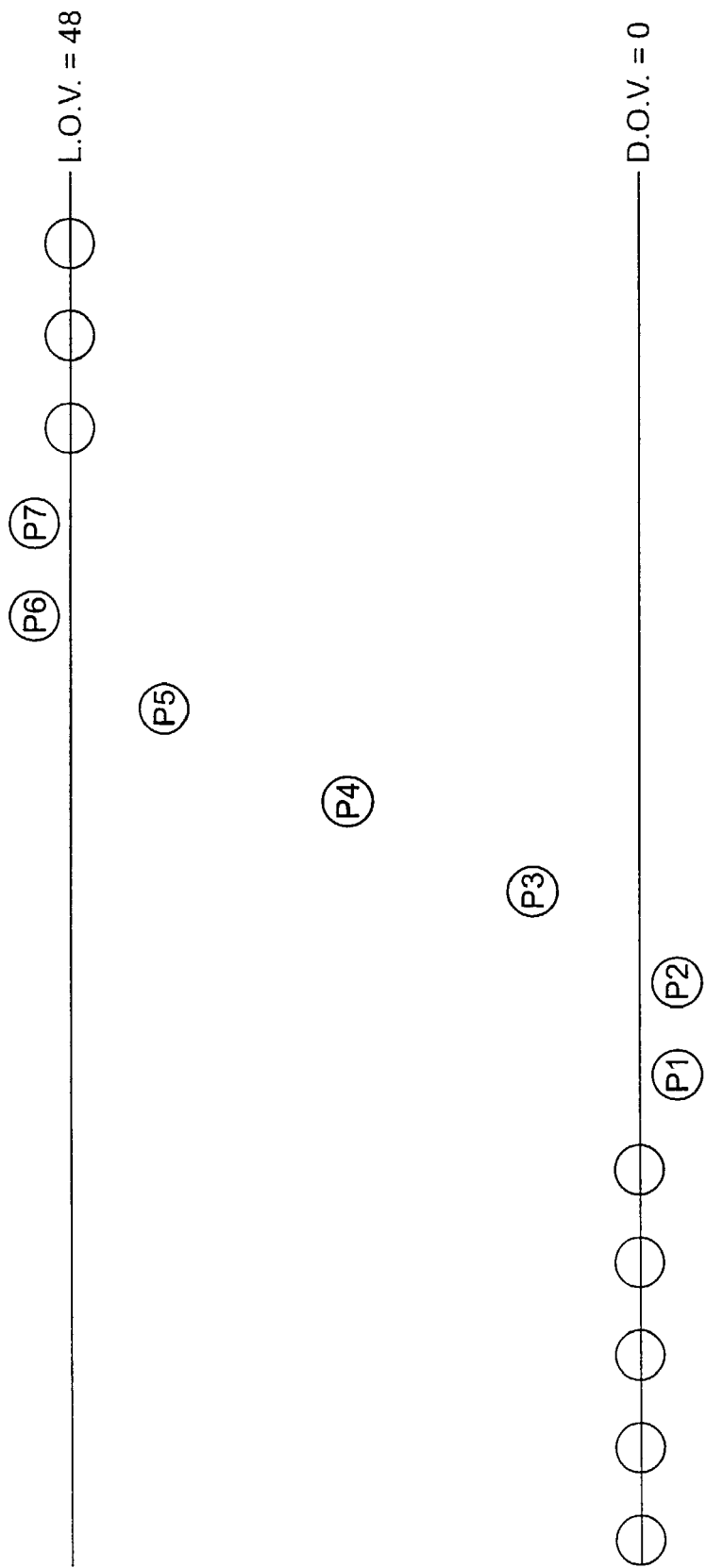
FIG. 6 is a graph of the pixel sequence of FIG. 5 after sharpening with a traditional Laplacian filter.
Figure 7:
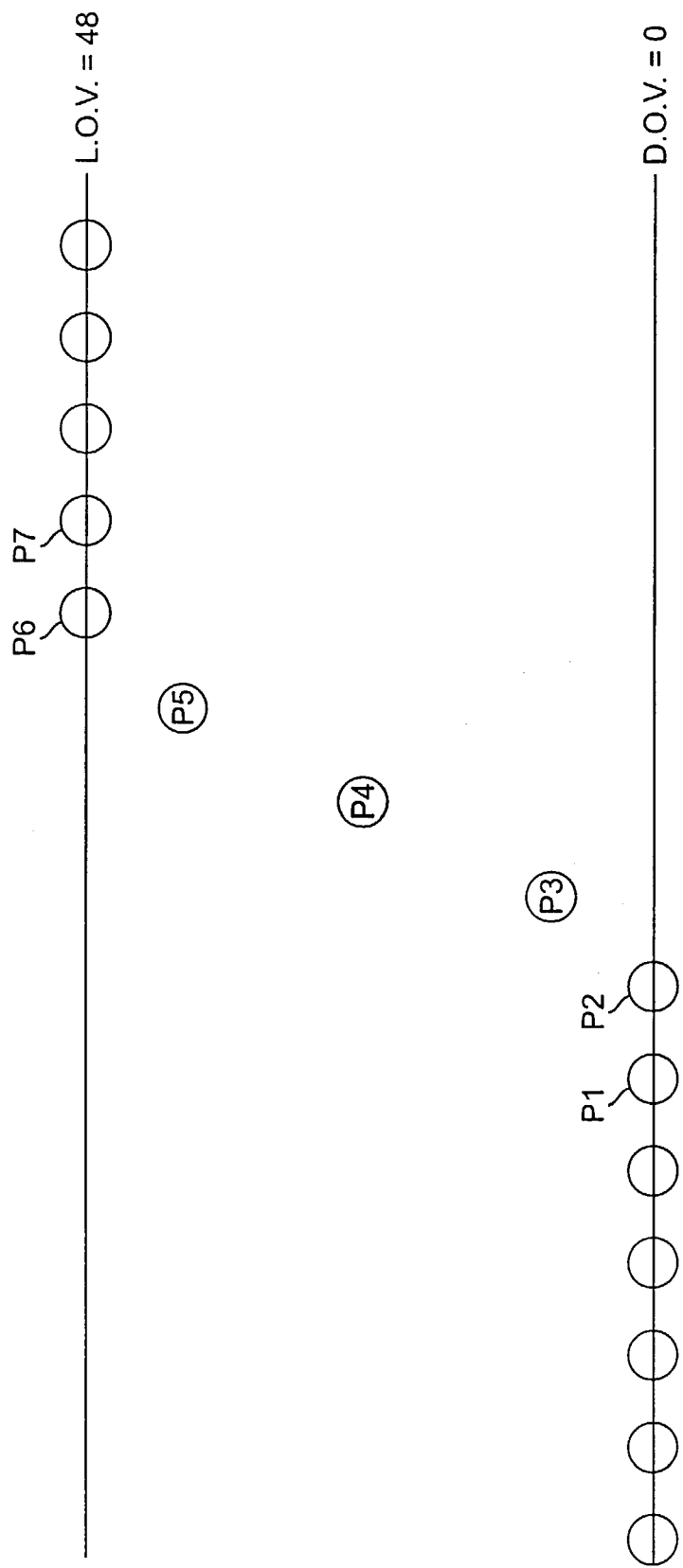
FIG. 7 is a graph of the pixel sequence of FIG. 5 in which the sharpened pixels are also clipped.

Each edge pixel in FIG. 5 is subjected to the same sharpening and clipping operation resulting in the graph shown in FIG. 7. The clipped pixel values are listed in the fourth column of Table 1. As discussed previously, clipping with the apparatus of the invention is carried out in clipping block 365, so as to limit b2' to lie between the unsharpened pixel values of the neighborhood pixels.

As discussed before, pixels can be sharpened without prior edge detection by applying a different Laplacian filter, such as the filter of equation (4), to the neighborhood of pixels. With no edge detection, the values of all neighboring pixels of b2 are added in a first adder 345 and multiplied by the negative value of the desired sharpening parameter S which is supplied to the input of the first multiplier 350. The value 8S+1 is supplied to the input of the second multiplier 355 and multiplied by the value b2, whereafter the outputs of first multiplier 350 and second multiplier 355 are added in a second adder 360. Thereafter, the process is identical to the process used with edge sharpening.

If there is no edge detection, the values Px and Py to which b2 is clipped in switch 365, are the minimum and maximum values, respectively, among all neighboring pixels. As discussed before, the center pixel b2 is excluded if switch 343 is used. Otherwise, b2 is included in the neighborhood of pixels.

Figure 8:
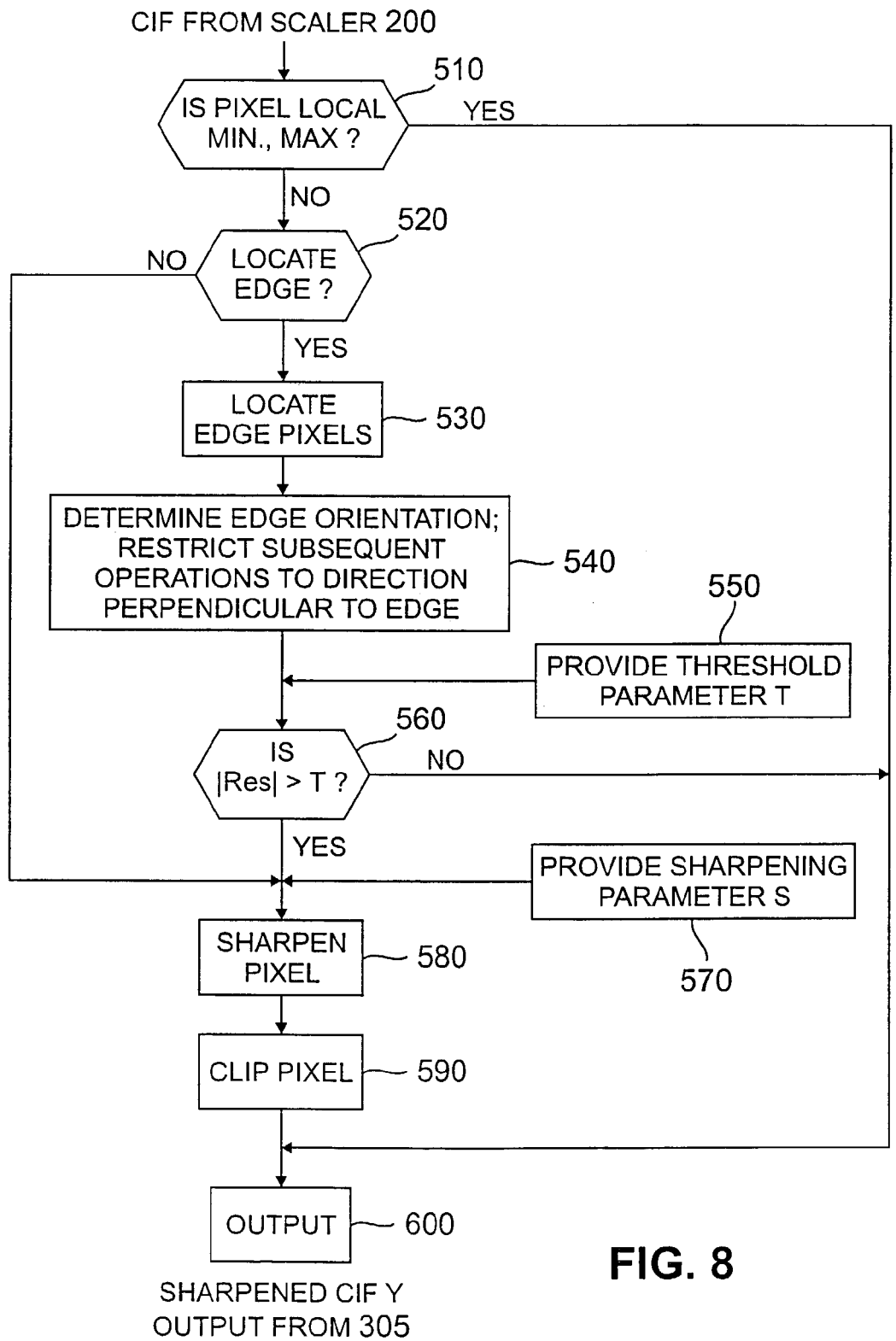
FIG. 8 is a flow chart of a digital image sharpening method.

FIG. 8 illustrates in the form of a flow diagram a method for carrying out the present invention of sharpening a digitally processed video image comprised of pixels in which each pixel has a numerical value and resides in a neighborhood of pixels.

In the present example, the CIF signal is received from the Y video output of scaler 200. In a first step 510, the pixel to be sharpened is evaluated so as to determine if the pixel is a local minimum or maximum.

As noted above, step 510 can be omitted if the pixel to be sharpened and clipped is counted among the pixels in the selected neighborhood of pixels. In this case, if the pixel were a local minimum or maximum, the process branches directly to step 580, where the pixel is sharpened, but is subsequently clipped to itself in step 590. Consequently, a local minimum or maximum is passed to output 600 without sharpening, independent of the method used.

If the pixel is not a local minimum or maximum, then the process flow branches in decision step 520 depending if an edge is to be detected or not. If the pixel is to be sharpened regardless of the presence of an edge, then the process flow branches directly to step 580.

If an edge is to be detected first, then an edge filter, e.g., the Kirsch filter described above, is applied in step 530 to determine if the pixel is indeed located on an edge. In the next step 540, the edge orientation is determined from the maximum value of |Res| and the edge is then sharpened only in the direction perpendicular to the edge direction. As explained before, an edge is sharpened only if the largest absolute value of Res (Equation 1) is larger than a predetermined threshold value T which can be provided at any step before step 560, for example in step 550. T can be provided either by the user or, preferably, automatically adaptively in response to, for example, camera settings (zoom ratio) and illumination conditions (noise). If in step 560 |Res| is smaller than T, then the pixel is not deemed to be located on an edge, and the process flow branches directly to output 600, that is, the pixel is not sharpened. However, if |Res| is greater than T, then the pixel is presumed to lie on an edge and is sharpened in step 580 with a sharpening parameter S which is supplied in step 570. Like the threshold parameter T, the parameter S can be provided either by the user or, preferably, automatically adaptively in response to, for example, the zoom ratio. S can be supplied at any step before step 570.

After the pixel is sharpened in step 580, the value of the sharpened pixel is "clipped" so as to lie between the unsharpened numerical values of any of the pixels within its sharpening neighborhood. If, as mentioned above, thresholding and sharpening of the pixel is restricted to the direction perpendicular to the edge, which is determined in step 540, then in step 590, the pixel value is also clipped only in the direction perpendicular to the edge. In step 600, the sharpened and clipped pixel value is then provided at the CIF Y video output of sharpener 305 (FIGS. 1 and 4).

The foregoing is considered to be illustrative only of the principles of the invention. The video information is not limited to input from a video camera, but can included, e.g., scanned input, input received via network connection and/or input received from a storage device. Other video formats, such as RGB, MPEG, etc., can also be used. Other hardware and/or software which performs similar functions, can be substituted. Modifications of the preferred embodiments disclosed herein will be apparent to those skilled in the art that are within the scope of the following claims.

What is claimed is:

1. A method of enhancing a digital image, the image comprised of image pixels, each image pixel associated with a numerical value and residing in a neighborhood of image pixels, the method comprising the steps of:
   scaling the image;
   locating edge pixels in the scaled image by applying an edge detector to the scaled image;
   sharpening with a convolution-based sharpening filter said edge pixels wherein said convolution-based sharpening filter is adapted to receive a sharpening parameter for controlling the sharpening, said sharpening parameter being defined by at least one of imaging parameters and of environmental conditions; and
   limiting the sharpened numerical value of each sharpened edge pixels so as to fall between the smallest unsharpened numerical value and the greatest unsharpened numerical value of the pixels located in said neighborhood of pixels.

2. The method of claim 1, wherein said edge detector is capable of detecting for each edge pixel an edge orientation.

3. The method of claim 1, wherein said imaging parameters are taken from group consisting of scaling ratio of the image, pan position and tilt position.

4. The method of claim 1, wherein the environmental conditions comprise lighting conditions of an object being imaged.

5. The method of claim 2, wherein said edge pixels are sharpened only in a direction perpendicular to the edge orientation.

6. The method of claim 1, wherein an edge pixel is sharpened only if an output value of said edge detector for said edge pixel exceeds a predetermined threshold value.

7. A method of enhancing a digital image, the image comprised of image pixels, each image pixel associated with a numerical value and residing in a neighborhood of image pixels, the method comprising the steps of:
   scaling the image;
   selecting image pixels to be sharpened in the scaled image;
   selecting at least two neighborhood pixels in said neighborhood of each of said image pixels to be sharpened so that each image pixel to be sharpened has a numerical value which lies between the numerical values of said neighborhood pixels;
   sharpening with a convolution-based sharpening filter said image pixels to be sharpened wherein said convolution-based sharpening filter is adapted to receive a sharpening parameter for controlling the sharpening, said sharpening parameter being defined by at least one of imaging parameters and of environmental conditions; and
   limiting the numerical value of each sharpened pixel so as to fall between the smallest unsharpened numerical value and the greatest unsharpened numerical value of the image pixels located in said neighborhood of pixels.

8. The method of claim 7, wherein an image pixel in said neighborhood of pixels is sharpened only if an output value of an edge detector for said image pixel exceeds a predetermined threshold value.

9. A device for enhancing a digital image comprised of image pixels, each image pixel associated with a numerical value and residing in a neighborhood of image pixels, the device comprising:
   a scaler for generating a scaled image from the digital image;
   a convolution-based sharpening filter for sharpening image pixels of the scaled image, wherein said convolution-based sharpening filter is adapted to receive a sharpening parameter for controlling the sharpening, said sharpening parameter being defined by at least one of imaging parameters and of environmental conditions; and a clipping device for limiting the numerical value of said sharpened pixels so as to fall between the smallest unsharpened numerical value and the greatest unsharpened numerical value of the image pixels located in said neighborhood of pixels.

10. The device of claim 9, further comprising an edge detector for locating edge pixels within said neighborhood of image pixels.

11. The device of claim 10, wherein said edge detector is capable of detecting an edge orientation of the edge pixels.

12. The device of claim 9, wherein said imaging parameters are taken from the group consisting of a scaling ratio of the image, a pan position and a tilt position.

13. The device of claim 9, wherein said environmental conditions comprise lighting conditions of an object being imaged.

14. The device of claim 11, wherein said edge pixels are sharpened only in a direction perpendicular to the edge orientation.

15. The device of claim 10, wherein a pixel is sharpened only if an output value of said edge detector for said pixels exceeds a predetermined threshold value.

16. The device of claim 10, wherein said edge detector comprises a precalculation block, and an edge angle detection block.

17. A video camera system comprising:
a video camera controllable by a user and capable of acquiring a digital image of an object, said image comprised of pixels;
an image sharpening device connected to said camera and comprising:
a scaler for generating a scaled image from the digital image;
a convolution-based sharpening filter for sharpening pixels located within a neighborhood of pixels in the scaled image, wherein said convolution-based sharpening filter is adapted to receive a sharpening parameter for controlling the sharpening, said sharpening parameter being defined by at least one of imaging parameters and of environmental conditions; and
a clipping device for limiting the sharpened numerical value of said sharpened pixels so as to fall between the smallest unsharpened numerical value and the greatest unsharpened numerical value of the pixels located within said neighborhood of pixels.

18. The camera system of claim 17, the image sharpening device further comprising an edge detector for locating edge pixels.

19. The camera system of claim 17, wherein the user can adjust at least one of a tilt and pan movement of the camera.

20. The camera system of claim 19, wherein said adjustment is accomplished by electro-mechanical actuators.

21. The camera system of claim 19, wherein said adjustment is accomplished electronically by selecting from said pixels a subset of pixels.

22. The camera system of claim 17, wherein said camera system is capable of providing a zoom function by selecting from said pixels a subset of pixels forming the image and wherein the sharpening parameter depends on the subset of pixels.

23. The camera system of claim 22, wherein said sharpening parameter is large if said subset of pixels contains a small number of pixels and said sharpening parameter is small if said subset of pixels contains a large number of pixels.

24. A video camera system for a set-top box comprising:
a video camera operatively integrated in said set-top box and adapted to acquire a digital image of an object, said image comprised of pixels;
said camera capable of electronically providing a tilt, pan and zoom function of the image by scaling the image, wherein said tilt, pan and zoom function is accomplished by selecting from said pixels a subset of pixels;
a convolution-based sharpening filter for sharpening pixels within a neighborhood of pixels in said subset of pixels, wherein said convolution-based sharpening filter is adapted to receive a sharpening parameter for controlling the sharpening, said sharpening parameter being defined by at least one of imaging parameters and of environmental conditions; and
a clipping device for limiting the sharpened numerical value of said sharpened pixels so as to fall between the smallest unsharpened numerical value and the greatest unsharpened numerical value of the pixels located within said neighborhood of pixels.

25. The video camera system of claim 24, further comprising:
an edge detector for locating edge pixels in said subset of pixels.

26. A device for enhancing a digital image, the device comprising:
a scaler for generating a scaled image from the digital image, the scaled image being comprised of pixels, each pixel associated with a numerical value and residing in a neighborhood of pixels;
a convolution-based sharpener for sharpening pixels in said neighborhood of pixels, wherein said convolution-based sharpening filter is adapted to receive a sharpening parameter for controlling the sharpening, said sharpening parameter being defined by at least one of imaging parameters and of environmental conditions; and
a clipping device for limiting the numerical value of said sharpened pixels so as to fall between the smallest unsharpened numerical value and the greatest unsharpened numerical value of the pixels located from said neighborhood of pixels.

27. A device for enhancing a digital image, the device comprising:
means for generating a scaled image from the digital image, the scaled image being comprised of pixels, each pixel associated with a numerical value and residing in a neighborhood of pixels;
means for convolutionally sharpening the pixels in said neighborhood of pixels, wherein said means for convolutionally sharpening the pixels is adapted to receive a sharpening parameter for controlling the sharpening, said sharpening parameter being defined by at least one of imaging parameters and of environmental conditions; and
means for limiting the numerical value of said sharpened pixels in said neighborhood of pixels so as to fall between the smallest unsharpened numerical value and the greatest unsharpened numerical value of the pixels located in said neighborhood of pixels.

* * * * *